July 24, 1956 C. E. BRANICK 2,755,847
PNEUMATIC TIRE BEAD DEPRESSOR
Filed Feb. 8, 1954 2 Sheets-Sheet 1

INVENTOR.
Charles E. Branick
BY
Merchant & Merchant
ATTORNEYS

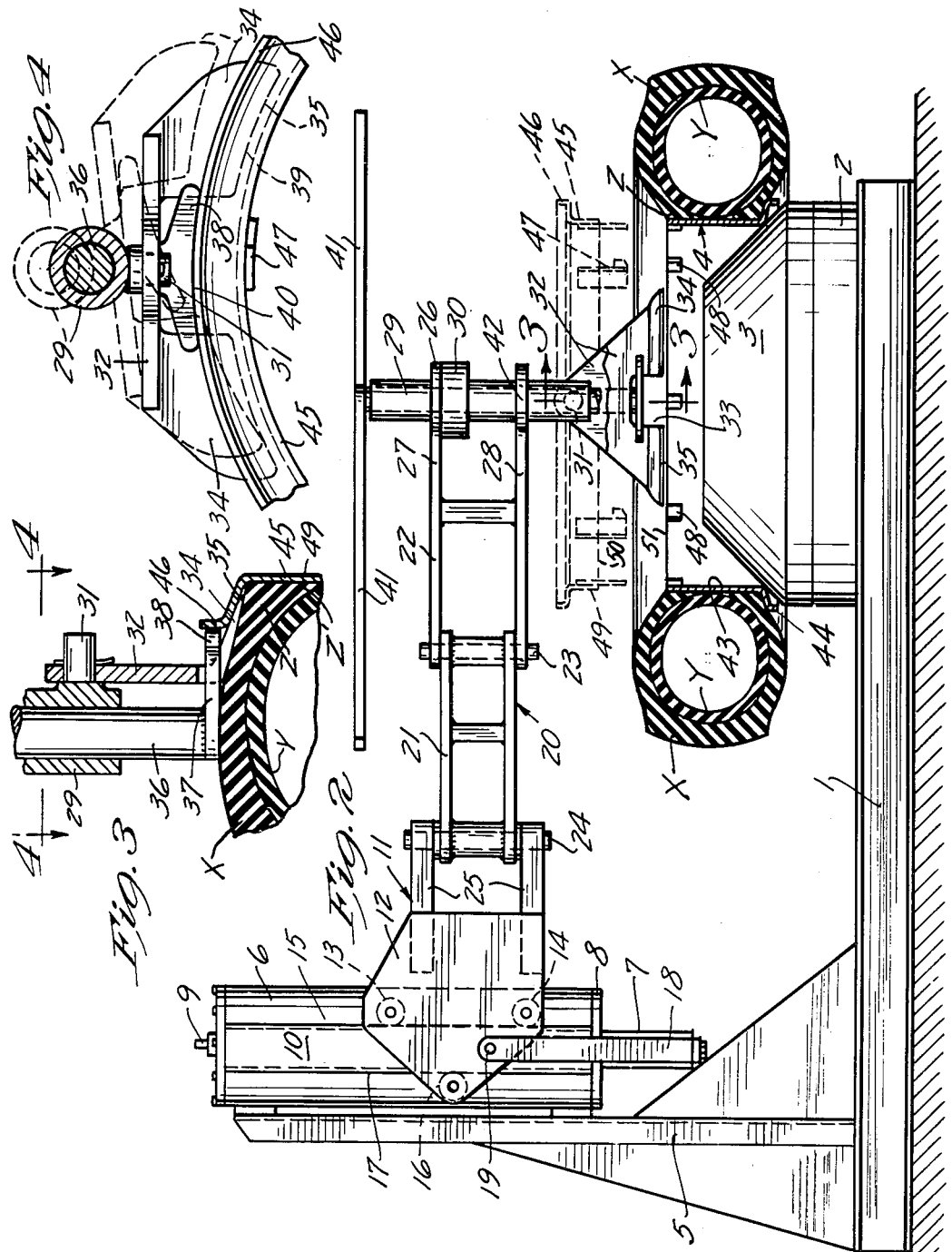

United States Patent Office 2,755,847
Patented July 24, 1956

2,755,847

PNEUMATIC TIRE BEAD DEPRESSOR

Charles E. Branick, Fargo, N. Dak.

Application February 8, 1954, Serial No. 408,904

4 Claims. (Cl. 157—1)

My invention relates to devices for facilitating the application of rims to pneumatic tire casings and more particularly to devices for depressing the beads of large-size pneumatic tire casings in order to facilitate the securing together of the cooperating rim sections.

More particularly, my invention relates to the applying of the cooperating sections of curing rims to large-size pneumatic tire casings immediately prior to the retreading operation. Curing rims conventionally involve cooperating cylindrical sections each of which is provided at its axially outer edge with a radially outwardly projecting, circumferentially extended bead-engaging flange. The sections are inserted through the tire from opposite sides and are locked in end to end engagement by partial rotation of one section with respect to the other to cause locking engagement between cooperating locking elements. However, because of the extreme thickness of the walls of some of the larger tires, it is often extremely difficult to depress the beads sufficiently to cause the rim sections to come into end to end abutment. Frequently, the services of several men, standing on, or pushing downwardly at circumferentially spaced points upon the uppermost bead, is required to accomplish this task. The primary object of my invention is the provision of a mechanical device by which the beads of even the largest pneumatic tires may be depressed with ease by a single operator.

A further object of my invention is the provision of a device of the class above described which will apply depressive force against the side-walls and bead portions of a pneumatic tire in a manner to prevent binding of the bead being depressed, against the adjacent rim section. To this end I provide presser foot elements which have toe portions which engage the sides of the beads closely adjacent their radially innermost limits. These toe portions frequently become frictionally squeezed by the rim flange and the bead after application of the uppermost rim section.

A further object of my invention is the provision of a device of the class immediately above described, which is provided with means for quickly and easily moving the presser foot elements radially outwardly whereby to remove the frictionally engaged toe elements from between the tire bead and the bead flange.

A still further object of my invention is the provision of a device of the class described which is extremely simple in its operation, is rugged in construction and capable of applying great force.

A still further object of my invention is the provision of a device of the class described, which is relatively inexpensive to produce and compact in size.

The above and still further objects of my invention will become apparent from the following detailed specification, appended claims and attached drawings.

Referring to the drawings:

Fig. 2 is a view partly in side elevation and partly in vertical section;

Fig. 3 is an enlarged fragmentary sectional view taken substantially on the line 3—3 of Fig. 2; and Fig. 4 is a view in section taken on the line 4—4 of Fig. 3.

Figure 1:
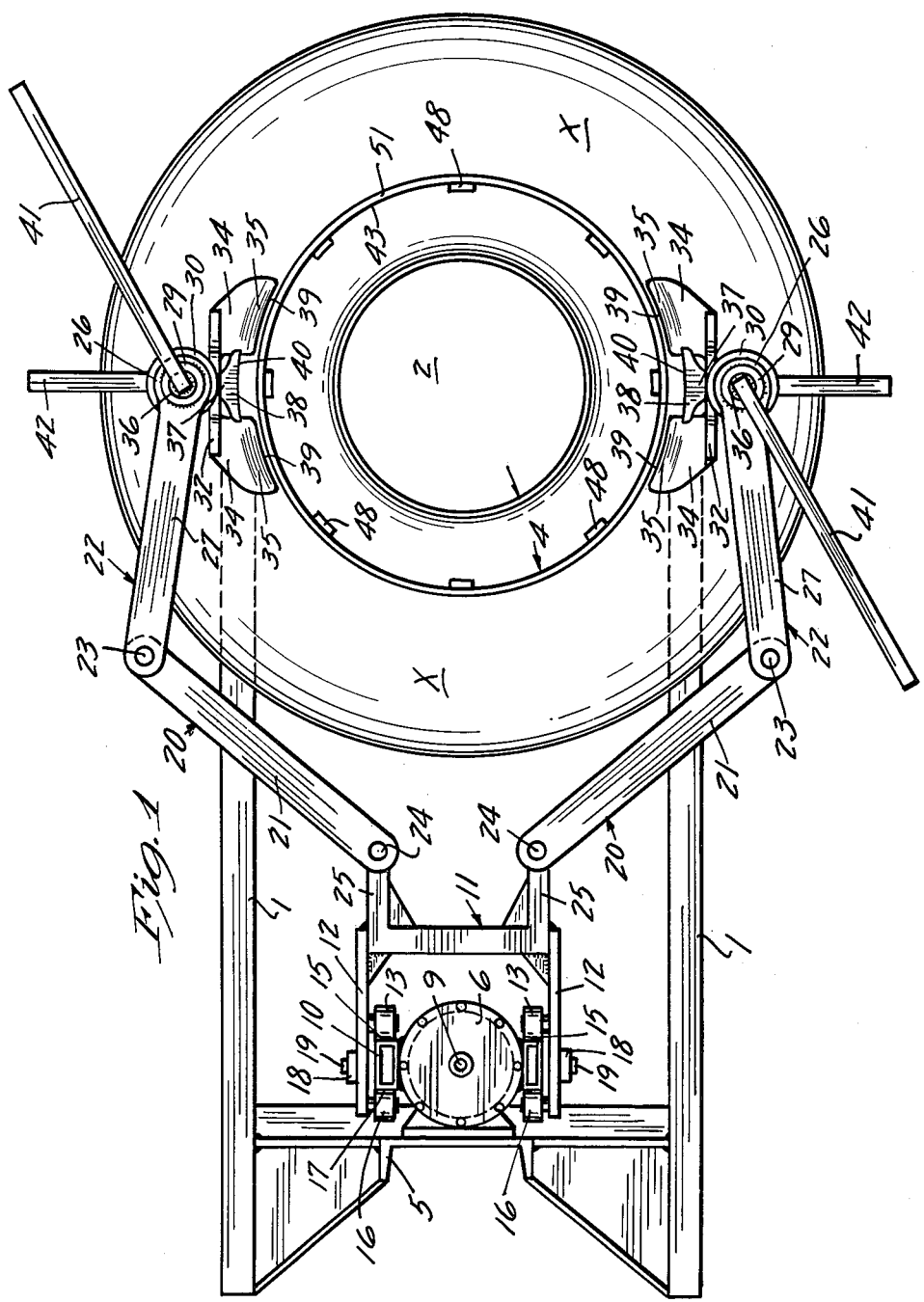
Fig. 1 is a view in top plan of my novel device.

Referring with greater particularity to the drawings, the numeral 1 indicates a base, upon one end of which is mounted a rim section mounting means 2, having a frusto-conical upper end portion 3 adapted to hold rim sections 4, of varying diameters, in horizontal positions.

In laterally spaced relation to the rim mounting means 2 is supporting structure 5 for a vertically disposed cylinder 6 having therein a fluid-pressure operated piston, not shown, secured to a plunger 7 projecting downwardly through a head 8. Fluid under pressure is introduced into the cylinder 6 above the piston through a valve-equipped stem, or the like, 9. Return of the piston and plunger 7 to its uppermost limits may be accomplished by any suitable means such as a coil spring, not shown, within the cylinder 6.

Preferably, and as shown, a pair of guide rails 10 are rigidly secured to the exterior of the cylinder 6, one on each side thereof. A carriage, identified in its entirety by the numeral 11, includes a pair of laterally spaced side frame members 12, disposed one each adjacent one of said guide rails 10. As shown, particularly in Figs. 1 and 2, a plurality of anti-friction members are rigidly secured to the side frame members 12 in opposed relationship. These anti-friction members are in the nature of rollers 13 and 14, which are vertically aligned and are adapted to ride upon the inner faces 15 of the adjacent guide rails 10, and a single roller 16 laterally spaced from the rollers 13 and 14, and adapted to ride upon the outer surfaces 17 of the adjacent rail 10. Links 18 connect the lower end of the plunger rod 7 and the side frame members 12, preferably, and as shown, at points 19 lying in a vertical plane between the rollers 13 and 14 and the roller 16. The above method of securing together the plunger 7 and the carriage 11 upon the rails 15 assures freedom from binding, and thus reduces wear.

Rigidly secured to the carriage 11 for common vertical reciprocal movements therewith are a pair of laterally spaced arms each identified in its entirety by the numeral 20, and including arm sections 21 and 22 which are pivotally secured together as at 23. The inner ends of the arms 20 are pivotally secured through the axles 24 between pairs of mounting brackets 25 for swinging movements of their free ends 26 in a common horizontal plane overlying the rim mounting means 2. Pivotal connections 23 and 24 not only facilitate essential adjustment of the arms with respect to the rim of a given tire, but also permit said arms to be swung or folded out of the way when same are not in use. Preferably and as shown, the free ends 26 of the arm sections 22 are bifurcated, the upper and lower forked portions thereof being identified respectively by the numerals 27 and 28. Tubular shafts 29 are received in aligned openings, not specifically identified, in the upper and lower portions of the arm section 28 for rotation and limited axial sliding movements, said sliding movements being specifically limited by means of a collar element 30 which engages the members 27 and 28. Projecting radially outwardly from the tubular shafts 29, adjacent their lower ends, are trunnions 31 upon which are snugly rotatively received inverted V-shaped presser foot elements 32. As shown, the presser foot elements are cut away centrally as at 33 to provide in each a pair of laterally spaced feet 34 having radially outwardly and slightly downwardly extending arcuate tapering toe portions 35.

Journalled for rotation within the tubular shafts 29 are shafts 36 which extend below the tubular shafts 29 and have laterally extended restricted neck portions 37 which project through the openings 33 between the feet 34.

Neck portions 37 terminate in cam elements 38 above the plane of the feet 34, for a purpose which will hereinafter be apparent. It will be noted that the feet 34 have arcuate edges 39 whereas the cam elements 38 have arcuate outer edges 40. At their upper end portions, shafts 36 have radially outwardly extended handles 41 whereas the tubular shafts 29 are provided with similar handles 42.

When it is desired to put my novel structure into operation for the purpose of mounting a curing rim upon a pneumatic tire casing X, I place the axially deeper curing rim section 43 upon the frusto-conical upper end portion 3 of the rim mounting means 2 with the bead engaging flange 44 thereof on the bottom. Thereafter, the pneumatic tire casing X with an inner-tube Y therein is placed over the rim section 43 so that, as indicated in Fig. 2, one bead Z thereof comes into engagement with the bead flange 44. Thereafter, the curing rim section 45, of lesser axial depth than rim section 43, is dropped through the central opening in the tire casing X whereby to cause the bead flange 46 to engage the upper bead Z.

In order to depress the upper bead Z so as to enable the locking hooks 47 carried by the rim section 45 to engage the locking lugs 48 carried by the rim section 43, through rotary movements of the upper rim section 45 with respect to the lower rim section 43, the arms 20 are swung into position on pivots 23 and 24 as indicated in Fig. 1 whereby the toe portions 35 of the feet 34 underlie the bead flange 46 of the rim section 45 with the arcuate faces 39 thereof in engagement with the cylindrical portion 49 of the rim section 45. By particular reference to Fig. 3, it will be noted that the lower end portions of the shafts 36 engage the side-walls of the tire casing X radially outwardly of the feet 34, and at a slightly higher level than the feet 34 whereby the side-wall of the tire X is retained in its natural arcuate shape as it is depressed. This is extremely important as it prevents distortion of the side-wall and a consequent rocking of the upper bead Z during the depressive movements thereof. Such rocking movements are undesirable in view of the fact that they cause the toe portion Z' to bind against the cylindrical portion 49 of the rim section 45. Lowering of the feet 34 so as to depress the upper bead Z is accomplished by introducing fluid under pressure into the cylinder 6 above the piston through the tube 9. Lowering of the piston and the plunger 7 will likewise lower the carriage 11 on the rails 10. The arms 20, secured to the carriage 11, are lowered to the point where the collar 30 fast on the tubular shaft 29 engages the portion 26 of the bifurcated outer end portion 22.

When the upper bead Z has been depressed sufficiently to cause the adjacent end portions 50 and 51 respectively of the rim sections 45 and 43 to come into abutting engagement, the rim section 45 is rotated sufficiently to cause locking engagement between locking elements 47 and 48. Thereafter, the fluid within the cylinder 6 is released through a valve mechanism, not shown, and the carriage 11 and parts carried thereby returned to a raised position under bias of spring mechanism, not shown, within the cylinder 6.

Frequently the tapered toe portions 35 of the feet 34 become wedged or squeezed between the upper bead Z and the adjacent rim flange 46. Under such conditions, and in order to quickly release the toe portions 35 so as to swing the arms 20 radially outwardly of the tire X, rocking action is imparted to the handles 41 and 42. Rocking action on the handle 41 causes opposite ends of the cam element 38 to engage the bead flange 46 thereby tending, by cam action, to push the shafts 36 and parts associated therewith radially outwardly. Rocking action imparted to the handles 42 on the other hand, tends to alternatively free the spaced feet 34, see particularly Fig. 4.

My invention has been thoroughly tested and found to be completely satisfactory for the accomplishment of the above objects and while I have disclosed a preferred embodiment thereof, I wish it to be understood that same is capable of modification without departure from the scope of the appended claims.

What I claim is:

1. A pneumatic tire bead depressor comprising a base, means on said base for mounting a rim section in a horizontal plane, a carriage, structure mounting said carriage on said base in laterally spaced relation to said rim mounting means for reciprocal movements in a vertical plane, power operated means for imparting reciprocal movement to said carriage, an arm pivotally secured to said carriage for swinging movements of its free end in a horizontal plane overlying said rim mounting means, a presser foot element operatively carried by the free end of said arm, said presser foot element having a toe portion adapted to underlie the bead flange of a rim section adapted to be removably secured to a cooperating rim section on said rim mounting means, a bead-flange engaging cam element carried by said arm and overlying said presser foot element, means for imparting rocking movements to said presser foot in a horizontal plane and independent means for imparting rocking movements to said cam element in a horizontal plane.

2. The structure defined in claim 1 in which said power operated means includes a cylinder, a plunger equipped piston working within said cylinder, link means operatively connecting said carriage and said plunger, and means for introducing fluid under pressure into said cylinder above said piston.

3. The structure defined in claim 2 in which said cylinder is provided with a pair of guide rails one on each side thereof, and in which said carriage is provided with a pair of laterally spaced side frame members, disposed one each adjacent one of said guide rails, said side frame members having a plurality of opposed anti-friction members thereon which engage opposite edges of said adjacent guide rails.

4. The structure defined in claim 1 in which the arm comprises a pair of vertically spaced portions, said presser foot element and said cam element are carried by a tubular shaft slidably mounted on the free end of said arm and an enlarged collar on said tubular shaft working between said vertically spaced arm portions whereby to limit sliding movement of said tubular shaft.

References Cited in the file of this patent

UNITED STATES PATENTS

| | | |
|---|---|---|
| 1,106,888 | Pass | Aug. 11, 1914 |
| 1,124,316 | Pfleumer | Jan. 12, 1915 |
| 1,250,180 | Hughes | Dec. 18, 1917 |
| 1,416,094 | Krauska | May 16, 1922 |
| 2,536,139 | Ritter | Jan. 2, 1951 |
| 2,616,487 | Parks | Nov. 4, 1952 |